US012140092B1

(12) United States Patent
Gwidt et al.

(10) Patent No.: US 12,140,092 B1
(45) Date of Patent: Nov. 12, 2024

(54) METHODS AND SYSTEMS FOR CONTROLLING FUEL INJECTION

(71) Applicant: GM GLOBAL TECHNOLOGY OPERATIONS LLC, Detroit, MI (US)

(72) Inventors: J.Michael Gwidt, Brighton, MI (US); Jeffrey M Hutmacher, Fowlerville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/347,538

(22) Filed: Jul. 5, 2023

(51) Int. Cl.
*F02D 19/08* (2006.01)
*F02D 19/06* (2006.01)

(52) U.S. Cl.
CPC ....... *F02D 19/081* (2013.01); *F02D 19/0655* (2013.01); *F02D 19/0692* (2013.01)

(58) Field of Classification Search
CPC .. F02D 19/084; F02D 19/085; F02D 19/0655; F02M 69/046; F02M 2200/956; F02M 2200/95
USPC ...................................... 123/406.31; 701/103
See application file for complete search history.

(56) References Cited

U.S. PATENT DOCUMENTS 11,661,902 B1 * 5/2023 Gwidt .................. F02D 19/084 123/52.1
2007/0119411 A1 * 5/2007 Kerns ................ F02D 41/0007 123/304
2015/0122218 A1 * 5/2015 Wakao .................. F02D 19/061 123/304
2020/0063666 A1 * 2/2020 Yamamoto ............ F02D 19/087
2020/0362775 A1 * 11/2020 Cohn .................. F02N 11/0862

FOREIGN PATENT DOCUMENTS

| | | | | |
|---|---|---|---|---|
| CN | 101037961 A | * | 9/2007 | .............. F02B 15/00 |
| CN | 102953849 A | * | 3/2013 | .............. F02B 13/00 |
| CN | 108571393 A | * | 9/2018 | ........... F02D 41/004 |
| EP | 3763933 B1 | * | 11/2023 | ........... F02D 41/009 |
| JP | 2008223493 A | * | 9/2008 | |
| JP | 2009275573 A | * | 11/2009 | |
| JP | 2010024996 A | * | 2/2010 | ......... F02D 41/3094 |

(Continued)

OTHER PUBLICATIONS

JP 2014015878 English Translation (Year: 2014).*
JP 2008223493 A English Translation (Year: 2008).*

*Primary Examiner* — George C Jin
*Assistant Examiner* — Teuta B Holbrook
(74) *Attorney, Agent, or Firm* — Lorenz & Kopf LLP

(57) ABSTRACT

Systems and methods for controlling a fuel system associated with a propulsion system of a vehicle are provided. The method includes receiving, by a processor, a concentration of Ethanol in a fuel in the fuel system. The fuel system includes at least two fuel injection systems. The method includes determining, by the processor, a change in the concentration of Ethanol in the fuel exceeds a fuel concentration threshold, and determining, by the processor, the fuel with the change in the concentration of Ethanol has reached a divergence defined between the at least two fuel injection systems. The method includes determining, by the processor, a volume ratio between the at least two fuel injection systems, and outputting one or more control signals, by the processor, to command the at least two fuel injection systems based on the volume ratio.

20 Claims, 4 Drawing Sheets

(56) References Cited

FOREIGN PATENT DOCUMENTS

| | | | | | |
|---|---|---|---|---|---|
| JP | 2012193633 | A | * | 10/2012 | |
| JP | 2014015878 | A | * | 1/2014 | |
| SE | 534009 | C2 | * | 3/2011 | ........... F02D 19/061 |

* cited by examiner

METHODS AND SYSTEMS FOR CONTROLLING FUEL INJECTION

INTRODUCTION

The technical field generally relates to methods and systems for controlling fuel injection associated with an engine of a vehicle, and more particularly relates to methods and systems for controlling fuel injection of an internal combustion engine associated with a flex fuel vehicle.

Certain vehicles are powered by internal combustion engines, which combust a fuel with air within a cylinder to generate torque. Some of these vehicles are capable of combusting fuel with various concentrations of Ethanol, and may be generally considered "flex fuel" vehicles. Upon a change in the concentration of Ethanol in the fuel, due to a re-filling of the vehicle with a fuel having a different Ethanol concentration, for example, a fuel system associated with the vehicle may contain fuel with two different Ethanol concentrations. In certain instances, the internal combustion engine may be controlled differently based on Ethanol concentration to ensure optimal fuel economy, for example. When the fuel system contains different Ethanol concentrations, it may be difficult to determine which Ethanol concentration is being delivered to the cylinders.

Accordingly, it is desirable to provide methods and systems for controlling fuel injection of an internal combustion engine associated with a vehicle, which improves the fuel economy of the vehicle. Furthermore, other desirable features and characteristics of the present invention will become apparent from the subsequent detailed description and the appended claims, taken in conjunction with the accompanying drawings and the foregoing technical field and background.

SUMMARY

According to various embodiments, a method for controlling a fuel system associated with a propulsion system of a vehicle is provided. The method includes receiving, by a processor, a concentration of Ethanol in a fuel in the fuel system. The fuel system includes at least two fuel injection systems. The method includes determining, by the processor, a change in the concentration of Ethanol in the fuel exceeds a fuel concentration threshold, and determining, by the processor, the fuel with the change in the concentration of Ethanol has reached a divergence defined between the at least two fuel injection systems. The method includes determining, by the processor, a volume ratio between the at least two fuel injection systems, and outputting one or more control signals, by the processor, to command the at least two fuel injection systems based on the volume ratio.

The fuel concentration threshold is 20 percent, and the determining the change in the concentration of Ethanol in the fuel exceeds the fuel concentration threshold further comprises comparing a last known value of the concentration of Ethanol in the fuel to the concentration of Ethanol received from a fuel concentration sensor. The determining the fuel has reached the divergence is based on a pump flow rate of a fuel pump, a position of the fuel concentration sensor and a volume of a main fuel line associated with the vehicle. The at least two fuel injection systems include a port fuel injection system and a spark ignition direct injection system, and the determining the volume ratio between the port fuel injection system and the spark ignition direct injection system is based on a volume of the port fuel injection system from the divergence to a tip of at least one port fuel injector and a volume of the spark ignition direct injection system from the divergence to a tip of at least one direct fuel injector. The spark ignition direct injection system includes a high pressure fuel pump, and the volume of the spark ignition direct injection system includes the volume of the high pressure fuel pump. The method includes determining, by the processor, the fuel with the change in the concentration of Ethanol has reached at least one cylinder associated with the propulsion system. The at least two fuel injection systems include a port fuel injection system and a spark ignition direct injection system and the method includes based on the determining the fuel with the change in the concentration of Ethanol has reached the at least one cylinder, outputting one or more control signals, by the processor, to command the port fuel injection system and the spark ignition direct injection system to disable control based on the volume ratio. The at least two fuel injection systems include a port fuel injection system and a spark ignition direct injection system and the determining the fuel with the change in the concentration of Ethanol has reached the at least one cylinder is based on a pump flow rate of a fuel pump associated with the vehicle, a volume of the port fuel injection system from the divergence to a tip of at least one port fuel injector and a volume of the spark ignition direct injection system from the divergence to a tip of at least one direct fuel injector.

Further provided is a vehicle. The vehicle includes a propulsion system. The propulsion system includes a fuel system having a fuel tank configured to receive a fuel, a fuel pump fluidly coupled to the fuel tank and configured to direct the fuel to a main fuel line, and the main fuel line is fluidly coupled to at least two fuel injection systems at a divergence. The vehicle includes a fuel concentration sensor coupled to the main fuel line and configured to observe a concentration of Ethanol in the fuel. The vehicle includes a controller having a processor configured to: determine, based on the concentration of Ethanol in the fuel, whether the concentration of Ethanol in the fuel has a change that is greater than a fuel concentration threshold; determine, based on the change in the concentration of Ethanol as greater than the fuel concentration threshold, whether the fuel with the change in the concentration of Ethanol has reached the divergence; determine, based on the fuel with the change in the concentration of Ethanol reaching the divergence, a volume ratio between the at least two fuel injection systems; and output one or more control signals to command the at least two fuel injection systems based on the volume ratio.

The fuel concentration threshold is 20 percent. The controller is configured to determine the fuel has reached the divergence based on a pump flow rate of the fuel pump, a position of the fuel concentration sensor and a volume of the main fuel line associated with the vehicle. The at least two fuel injection systems include a port fuel injection system and a spark ignition direct injection system, and the controller is configured to determine the volume ratio between the port fuel injection system and the spark ignition direct injection system based on a volume of the port fuel injection system from the divergence to a tip of at least one port fuel injector and a volume of the spark ignition direct injection system from the divergence to a tip of at least one direct fuel injector. The spark ignition direct injection system includes a high pressure fuel pump, and the volume of the spark ignition direct injection system includes the volume of the high pressure fuel pump. The controller is further configured to determine the fuel with the change in the concentration of Ethanol has reached at least one cylinder associated with the propulsion system. The at least two fuel injection systems include a port fuel injection system and a spark ignition direct injection system, and based on the determination that the fuel with the change in the concentration of Ethanol has reached the at least one cylinder, the controller is further configured to output one or more control signals to command the port fuel injection system and the spark ignition direct injection system to disable control based on the volume ratio. The at least two fuel injection systems include a port fuel injection system and a spark ignition direct injection system, and the controller is configured to determine that the fuel with the change in the concentration of Ethanol has reached the at least one cylinder based on a pump flow rate of the fuel pump, a volume of the port fuel injection system from the divergence to a tip of at least one port fuel injector and a volume of the spark ignition direct injection system from the divergence to a tip of at least one direct fuel injector.

Also provided is a method for controlling a fuel system associated with a propulsion system of a vehicle. The method includes receiving, by a processor, a concentration of Ethanol in a fuel in the fuel system. The fuel system includes a port fuel injection system and a spark ignition direct injection system. The method includes determining, by the processor, a change in the concentration of Ethanol in the fuel exceeds a fuel concentration threshold, and determining, by the processor, the fuel with the change in the concentration of Ethanol has reached a divergence defined between the port fuel injection system and the spark ignition direct injection system. The method includes determining, by the processor, a volume ratio between the port fuel injection system and the spark ignition direct injection system, and outputting one or more control signals, by the processor, to command the port fuel injection system and the spark ignition direct injection system based on the volume ratio. The method includes determining, by the processor, the fuel with the change in the concentration of Ethanol has reached at least one cylinder associated with the propulsion system, and based on the determining the fuel with the change in the concentration of Ethanol has reached the at least one cylinder, outputting one or more control signals, by the processor, to command the port fuel injection system and the spark ignition direct injection system to disable control based on the volume ratio.

The determining the fuel has reached the divergence is based on a pump flow rate of a fuel pump and a volume of a main fuel line associated with the vehicle. The determining the volume ratio between the port fuel injection system and the spark ignition direct injection system is based on a volume of the port fuel injection system from the divergence to a tip of at least one port fuel injector and a volume of the spark ignition direct injection system from the divergence to a tip of at least one direct fuel injector. The determining the fuel with the change in the concentration of Ethanol has reached the at least one cylinder is based on a pump flow rate of a fuel pump associated with the vehicle, the volume of the port fuel injection system from the divergence to the tip of the at least one port fuel injector and the volume of the spark ignition direct injection system from the divergence to the tip of the at least one direct fuel injector.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure. As used herein, the term "about" denotes within 10%, and the term "substantially" denotes within 10%.

Figure 1:
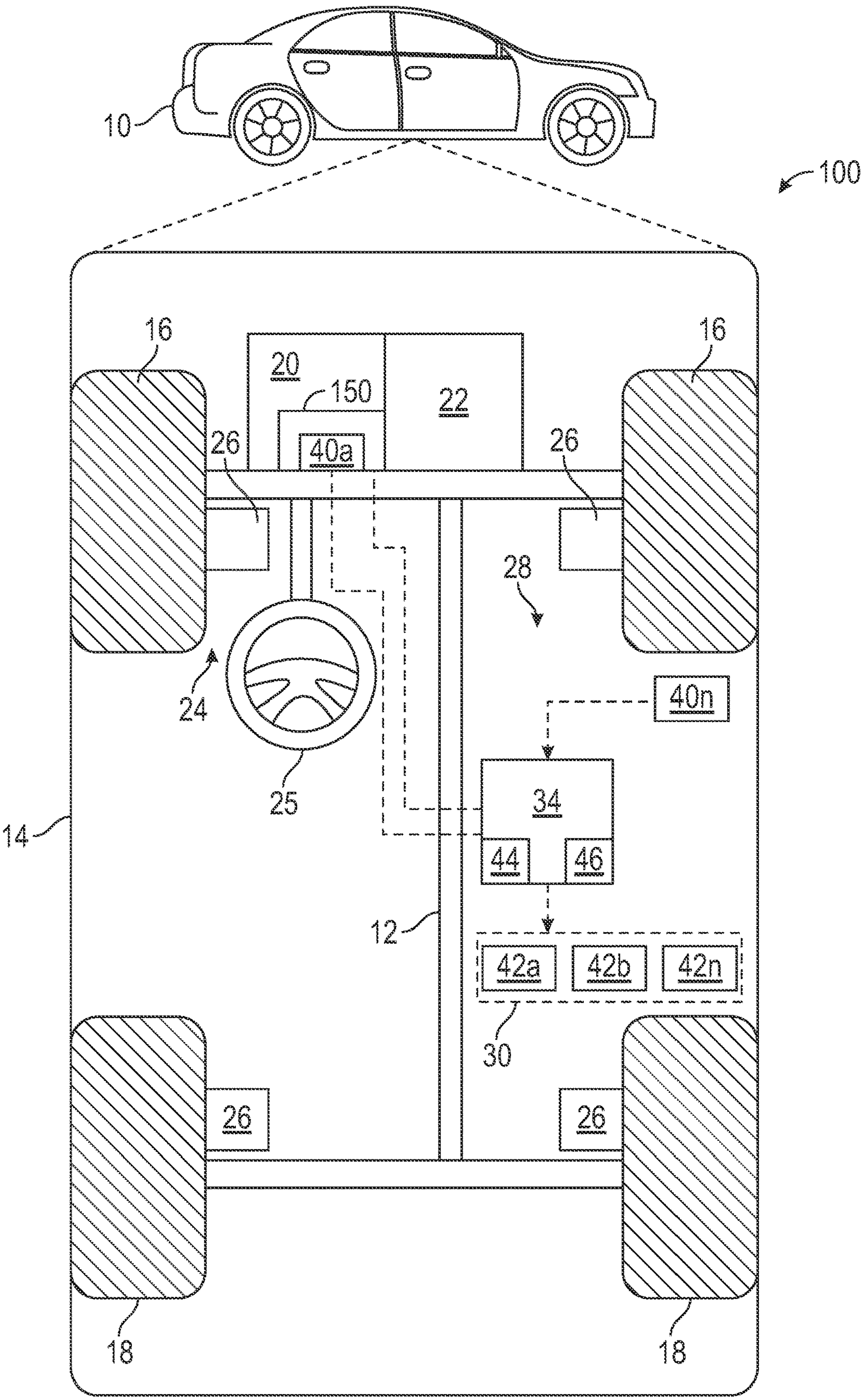
FIG. 1 is a functional block diagram illustrating a vehicle including a fuel injection control system, in accordance with various embodiments.

With reference to FIG. 1, a fuel injection control system shown generally as 100 is associated with a vehicle 10 in accordance with various embodiments. In general, the fuel injection control system (or simply "system") 100 generates one or more control signals for controlling a volume of fuel provided to a propulsion system 20 of the vehicle 10. In various embodiments, the propulsion system 20 includes a fuel injection system 150 that is a dual fuel injection system having at least two injection systems that each provide fuel to the propulsion system 20 according to a controlled timing and a controlled amount. As will be discussed, in one example, the fuel injection system 150 includes both a port fuel injection (PFI) system 152 and a spark ignition direct injection (SIDI) system 154 (FIG. 2) associated with a propulsion system 20 of the vehicle 10. As can be appreciated, other fuel injection systems can be implemented in various embodiments as the disclosure is not limited to the present examples.

In various embodiments, the fuel injection control system 100 generates the one or more control signals based on information obtained from a sensor system 28 of the vehicle 10 and/or from one or more modules associated with the vehicle 10. By controlling the volume of fuel supplied to the propulsion system 20, the fuel injection control system 100 ensures that each of the at least two fuel injection systems are operating with a same or similar fuel after a change in fuel, for example, due to a refueling. Such control improves fuel economy, drivability and may reduce emissions associated with the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14.

In various embodiments, the vehicle 10 is an autonomous vehicle or a semi-autonomous vehicle. As can be appreciated, the fuel injection control system 100 can be implemented in other non-autonomous systems and is not limited to the present embodiments. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes the propulsion system 20, a transmission system 22, a steering system 24, a brake system 26, the sensor system 28, an actuator system 30 and at least one controller 34. The propulsion system 20 may, in various embodiments, include an internal combustion engine, and portions of the fuel injection control system 100, as will be discussed with regard to FIG. 2.

The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems. The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40*a*-40*n* that sense observable conditions of the exterior environment and/or the interior environment of the vehicle 10. In various embodiments, the sensing devices 40*a*-40*n* include, but are not limited to, a fuel concentration sensor 40*a*. Generally, the fuel concentration sensor 40*a* observes a percent concentration of Ethanol contained in the fuel flowing through the fuel injection system 150 and generates sensor signals based on the observation. In one example, the fuel concentration sensor 40*a* is an Ethanol sensor, which observes a percent concentration of Ethanol within the fuel flowing through the fuel injection system 150. The sensor system 28, including the fuel concentration sensor 40*a*, is in communication with the controller 34 over a suitable media that enables the transfer of data, power, commands, etc., including, but not limited to a bus.

The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components (such as those used in connection with a navigation system), active safety seat or haptic seat, and the like. The actuator system 30, including the one or more actuator devices 42*a*-42*n*, is in communication with the controller 34 over a suitable media that enables the transfer of data, power, commands, etc., including, but not limited to a bus.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. In various embodiments, the controller 34 is configured to implement instructions of the fuel injection control system 100. In various embodiments, the instructions, when executed by the processor 44, receive and process sensor data from the sensor system 28 of the vehicle 10 and data received from other modules associated with the vehicle 10 to determine a change in a concentration of Ethanol in the fuel of the vehicle 10 and, in response, to determine whether and how to proportionally control the fuel injection system 150 based on a change in the concentration of Ethanol. Stated another way, based on the determination of a change in the percentage of Ethanol in the fuel, the instructions generate control signals to control the PFI system 152 (FIG. 2) and the SIDI system 154 (FIG. 2) to drain the fuel injection system 150 of the current fuel through operation of the propulsion system 20 such that the fuel with the different Ethanol concentration reaches the PFI system 152 and the SIDI system 154 substantially simultaneously to ensure drivability, while improving fuel economy and emissions associated with the vehicle 10. Generally, Ethanol has the chemical formula $CH_3CH_2OH$, and is also known as ethyl alcohol, grain alcohol, and EtOH.

Figure 2:
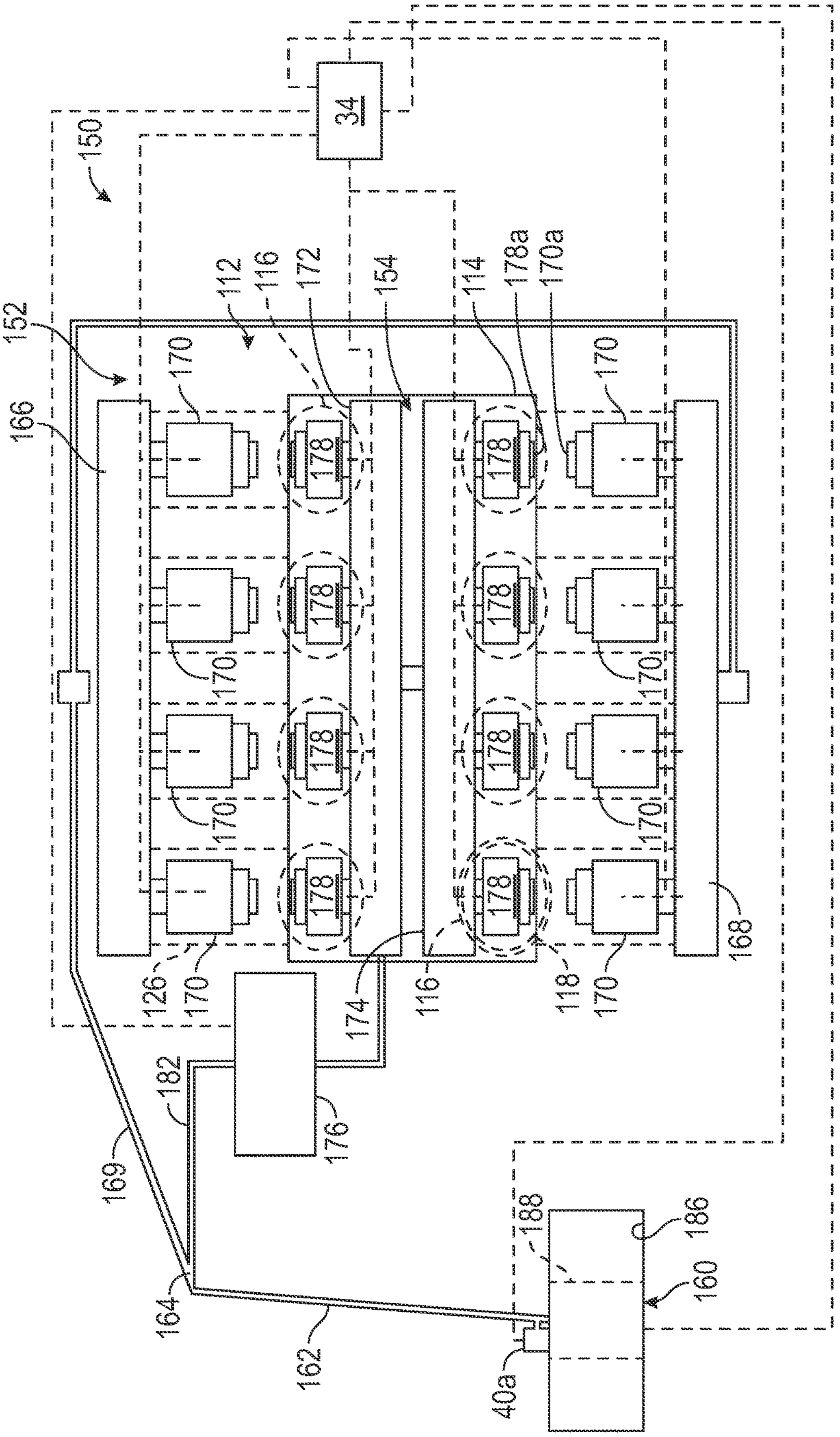
FIG. 2 is a schematic illustration of a propulsion system for the vehicle of FIG. 1 which includes the fuel injection control system, in accordance with various embodiments.

With reference to FIG. 2, the exemplary propulsion system 20 is shown in greater detail. In this example, the propulsion system 20 is an internal combustion engine 112 having an engine block 114 defining at least one cylinder 116 having a piston 118 coupled to rotate a crankshaft. A cylinder head cooperates with the piston 118 to define a combustion chamber 124. A fuel and air mixture is injected into the combustion chamber 124 and ignited resulting in hot expanding exhaust gases causing reciprocal movement of the piston 118. The fuel may comprise gasoline, Ethanol, a mixture of gasoline with Ethanol, etc., and the internal combustion engine 112 may include at least one spark plug, etc. In this example, the internal combustion engine 112 includes eight cylinders 116, however, it should be understood that the internal combustion engine 112 may include any number of cylinders 116. The fuel injection system 150 includes the PFI system 152 and the SIDI system 154, a fuel source 160, a main fuel line 162 and a divergence 164. The PFI system 152 includes a first PFI fuel rail 166 and a second PFI fuel rail 168, each associated with a respective bank of cylinders 116. Each of the first PFI fuel rail 166 and the second PFI fuel rail 168 is in fluid communication with the main fuel line 162 to receive the fuel via a PFI fuel line 169. The PFI fuel line 169 is fluidly coupled to the main fuel line 162 at the divergence 164. Each of the first PFI fuel rail 166 and the second PFI fuel rail 168 includes a plurality of port fuel injectors 170. The port fuel injectors 170 are controlled, based on one or more control signals from the controller 34, to inject the fuel into an intake port 126 associated with a respective one of the cylinders 116. Each of the port fuel injectors 170 include any suitable port fuel injector, and each of the port fuel injectors 170 define an internal volume that extends to a tip 170*a* of each of the port fuel injectors 170.

The SIDI system 154 includes a first SIDI fuel rail 172, a second SIDI fuel rail 174 and a high pressure fuel pump 176. The first SIDI fuel rail 172 and the second SIDI fuel rail 174 are each associated with a respective bank of cylinders 116. Each of the first SIDI fuel rail 172 and the second SIDI fuel rail 174 include a plurality of direct fuel injectors 178. The direct fuel injectors 178 are controlled, based on one or more control signals from the controller 34, to directly inject the fuel into the respective cylinder 116. Each of the direct fuel injectors 178 include any suitable direct fuel injector, and each of the direct fuel injectors 178 define an internal volume that extends to a tip 178*a* of each of the direct fuel injectors 178. The high pressure fuel pump 176 is in fluid communication with one or both of the first SIDI fuel rail 172 and the second SIDI fuel rail 174. In one example, the first SIDI fuel rail 172 and the second SIDI fuel rail 174 are interconnected by a fuel conduit 180, and the high pressure fuel pump 176 is fluidly coupled to the first SIDI fuel rail 172. The high pressure fuel pump 176 raises a pressure of the fuel received from the main fuel line 162 for injection into the cylinders by the direct fuel injectors 178. In this example, the high pressure fuel pump 176 is in fluid communication with the main fuel line 162 via a SIDI fuel line 182. The SIDI fuel line 182 is fluidly coupled to the main fuel line 162 at the divergence 164.

The fuel source 160 provides fuel to the fuel injection system 150. In one example, the fuel source 160 includes at least one fuel tank 186 and a fuel pump 188. The fuel tank 186 is configured to receive and retain the fuel, which may be provided from an external source via an inlet pipe, for example. The fuel pump 188 may be disposed within the fuel tank 186, and fluidly coupled to both the fuel tank 186 and the main fuel line 162 to supply the fuel at a predetermined or predefined flow rate from the fuel tank 186. The main fuel line 162 is fluidly coupled to the fuel source 160 and directs the fuel from the fuel source 160 to the divergence 164. In one example, the fuel concentration sensor 40*a* is fluidly coupled to the fuel injection system 150 via the main fuel line 162 and is fluidly coupled to the main fuel line 162 proximate or at an outlet of the fuel tank 186 to observe the fuel as it flows from the fuel tank 186 into the main fuel line 162. The divergence 164 is a location downstream of the fuel source 160 in which the fuel from the fuel source 160 is diverted or directed into both the PFI system 152 and the SIDI system 154. The divergence 164 may comprise a Y-shaped pipe connector, T-shaped pipe connector, etc. Generally, the main fuel line 162 is coupled to the divergence 164 without a valve, such that the fuel from the main fuel line 162 is supplied equally to the PFI fuel line 169 and the SIDI fuel line 182. It should be noted that the arrangement of the fuel source 160, the main fuel line 162, the divergence 164, the PFI fuel line 169 and the SIDI fuel line 182 are merely exemplary, as the arrangement of these components may vary from vehicle to vehicle.

Generally, each of the cylinders 116 has at least two valves, an intake valve, and an exhaust valve, which are each actuated by a camshaft rotating in time with the crankshaft. The intake valves selectively allow air into the combustion chamber 124 from the intake port 126 and the exhaust valves alternately allow exhaust gases to exit through an exhaust port(s). In some examples, a cam phaser may selectively vary the timing between the camshaft and the crankshaft. The air may be distributed to the air intake port(s) through an intake manifold. An air intake duct may provide air from the ambient environment to the intake manifold and a throttle body may be provided to regulate the flow of air into the intake manifold. At least the fuel pump 188, the port fuel injectors 170, the direct fuel injectors 178, high pressure fuel pump 176, and the throttle body may be in communication with the controller 34 over a suitable media that enables the transfer of data, power, commands, etc., including, but not limited to a bus.

Figure 3:
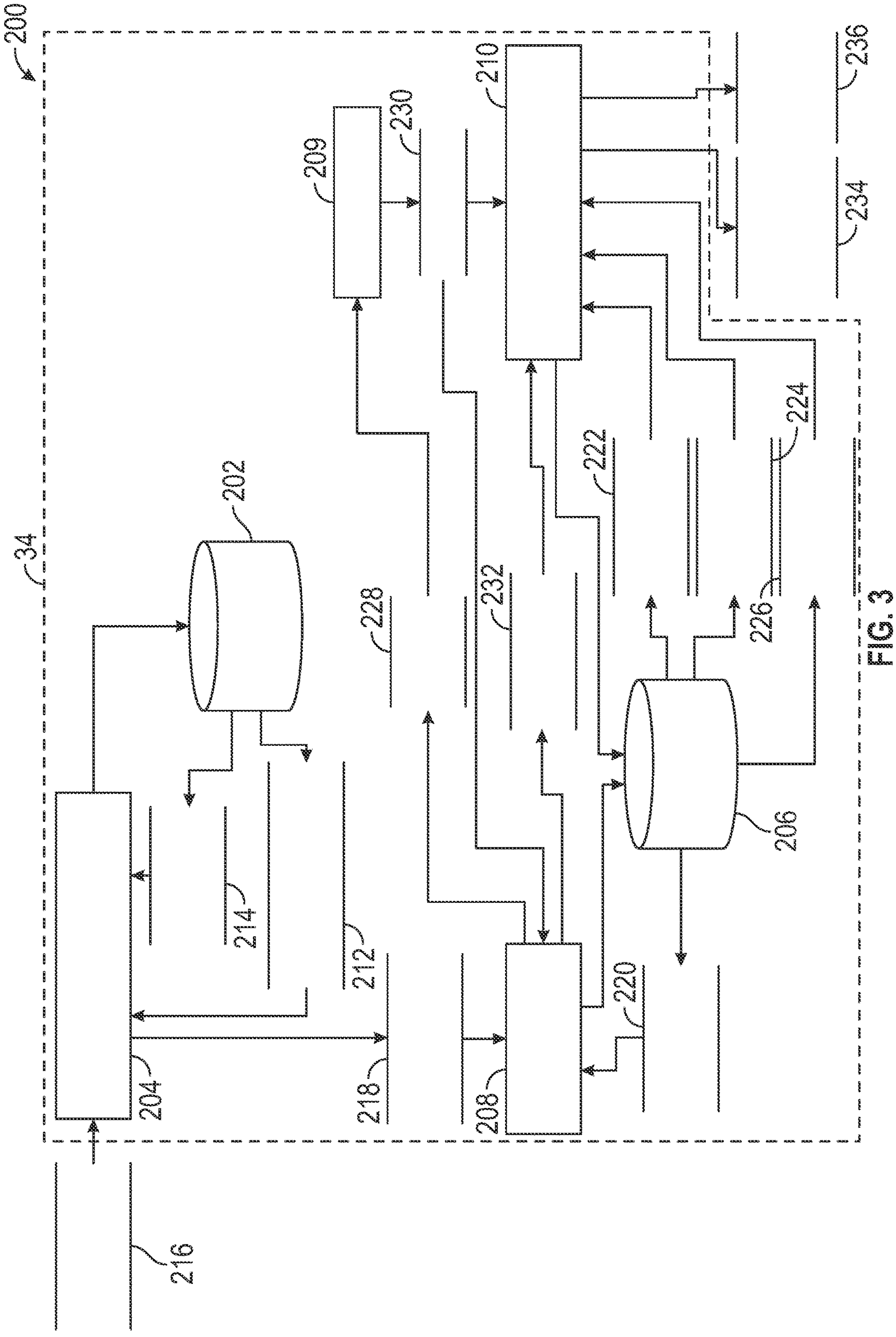
FIG. 3 is a dataflow diagram illustrating a control module associated with the fuel injection control system of the vehicle in accordance with various embodiments.

As shown in more detail with regard to FIG. 3 and with continued reference to FIGS. 1 and 2, a dataflow diagram illustrates an embodiment of a control module 200 of the fuel injection control system 100, which may be implemented by or incorporated into the controller 34 and/or the processor 44. In various embodiments, the control module 200 may be implemented as one or more sub-modules. Various embodiments of the control module 200 according to the present disclosure can include any number of sub-modules embedded within the controller 34. As can be appreciated, the sub-modules shown in FIG. 3 can be combined and/or further partitioned to generate control signals to the fuel injection system 150. Data inputs to the control module 200 may be received from the sensor system 28 (FIGS. 1 and 2), received from other control modules (not shown) associated with the vehicle 10, and/or determined/modeled by other sub-modules (not shown) within the controller 34. In various embodiments, the control module 200 includes a fuel datastore 202, a fuel concentration monitor module 204, a fuel system datastore 206, a fuel system monitor module 208, a timer module 209 and a fuel injector control module 210.

The fuel datastore 202 stores data of a fuel concentration threshold 212 and a last known value 214. The fuel concentration threshold 212 is a predefined or predetermined value for a percent change in Ethanol concentration in the fuel. In one example, the fuel concentration threshold 212 is about 20 percent. The last known value 214 is a value for the percent concentration of Ethanol in the fuel, which was last observed by the fuel concentration sensor 40*a* and is stored by the fuel concentration monitor module 204 in the fuel datastore 202.

The fuel concentration monitor module 204 receives as input the concentration data 216. The concentration data 216 is data received from the fuel concentration sensor 40*a* and/or data modeled by other means, which includes the observed percent of Ethanol in the fuel. Based on the receipt of the concentration data 216, the fuel concentration monitor module 204 queries the fuel datastore 202 and retrieves the last known value 214 for the percent concentration of Ethanol in the fuel. The fuel concentration monitor module 204 compares the last known value 214 for the Ethanol concentration to the concentration data 216 and determines the percent change in the concentration of Ethanol. The fuel concentration monitor module 204 queries the fuel datastore 202, and retrieves the fuel concentration threshold 212. The fuel concentration monitor module 204 determines whether the percent change in the concentration of Ethanol is greater than the fuel concentration threshold 212, or if the percent change in the concentration of Ethanol is greater than about 20%. If the percent change in the concentration of Ethanol is greater than about 20%, the fuel concentration monitor module 204 sets fuel change data 218 for the fuel system monitor module 208. The fuel change data 218 is data that indicates that the concentration of Ethanol in the fuel has changed by at least the value of the fuel concentration threshold 212, such that the fuel injection system 150 should be drained to enable the change in fuel to reach each of the port fuel injectors 170 and the direct fuel injectors 178 substantially simultaneously. The fuel concentration monitor module 204 saves the concentration of the Ethanol from the concentration data 216 observed by the fuel concentration sensor 40*a* as the last known value 214 in the fuel datastore 202.

The fuel system datastore 206 stores data of a divergence time value 220, PFI volume data 222, SIDI volume data 224 and cylinder time value 226. The divergence time value 220 is a predefined or predetermined value for an amount of time in seconds that it takes for the fuel to flow from the fuel concentration sensor 40*a* through the main fuel line 162 to the divergence 164. Generally, as a flow rate of the fuel is a known or predefined pump flow rate for the fuel pump 188 in Liters per second (L/s), for example, and the volume of the main fuel line 162 in Liters (L), for example, is also a known or predefined value, the divergence time value 220 may be determined based on the pump flow rate for the fuel pump 188 and the volume of the main fuel line 162 from the fuel concentration sensor 40*a* to the divergence 164. In one example, the pump flow rate is about 200 Liters per hour (Lph) to about 400 Liters per hour (Lph), the volume of the main fuel line 162 is about 1 Liter (L) to about 3 Liters (L), and the divergence time value 220 is about 2 seconds (s) to about 5 seconds (s). It should be noted that the pump flow rate, the volume of the main fuel line 162 and the divergence time value 220 may vary depending upon the arrangement of the fuel injection system 150 within the vehicle 10. The PFI volume data 222 is a predefined or predetermined value for a volume of the PFI system 152. Generally, the PFI volume data 222 is the sum of the volume of the PFI fuel line 169 (from the divergence 164 to the first PFI fuel rail 166), the volume of the first PFI fuel rail 166, the volume of the second PFI fuel rail 168 and the volume of each of the port fuel injectors 170 to the tip 170*a* of each of the port fuel injectors 170. In one example, the PFI volume data 222 is about 0.1 Liters (L). It should be noted that while the fuel system datastore 206 is described herein as storing predefined values for the divergence time value 220, the PFI volume data 222, the SIDI volume data 224 and the cylinder time value 226, in other embodiments, a control module for the fuel injection control system 100 may include a fuel system module, which determines each of the divergence time value 220, the PFI volume data 222, the SIDI volume data 224 and the cylinder time value 226 in real-time during the operation of the vehicle 10.

The SIDI volume data 224 is a predefined or predetermined value for a volume of the SIDI volume data 224. Generally, the SIDI volume data 224 is the sum of the volume of the SIDI fuel line 182 (from the divergence 164 to the first SIDI fuel rail 172), the volume of the high pressure fuel pump 176, the volume of the first SIDI fuel rail 172, the volume of the second SIDI fuel rail 174 and the volume of each of the direct fuel injectors 178 to the tip 178*a* of each of the direct fuel injectors 178. In one example, the SIDI volume data 224 is about 0.3 Liters (L). The cylinder time value 226 is a predefined or predetermined value for an amount of time in seconds that it takes for the fuel to flow from the divergence 164, through each of the PFI system 152 and the SIDI system 154, respectively, to the cylinders 116. Generally, as a flow rate of the fuel is the known or the predefined pump flow rate for the fuel pump 188 in Liters per second (L/s), for example, and the volume of each of the PFI system 152 and the SIDI system 154 in Liters (L), for example, is also a known or predefined value, the cylinder time value 226 may be determined based on the pump flow rate for the fuel pump 188 and the volume of the PFI system 152 and the SIDI system 154. In one example, the cylinder time value 226 is about 0.5 seconds (s) to about 2.5 seconds (s). It should be noted that the volume of each of the PFI system 152 and the SIDI system 154 and the cylinder time value 226 may vary depending upon the arrangement of the fuel injection system 150 within the vehicle 10.

The fuel system monitor module 208 receives as input the fuel change data 218. Based on the receipt of the fuel change data 218, the fuel system monitor module 208 sets enable data 228 for the timer module 209. The fuel system monitor module 208 queries the fuel system datastore 206 and retrieves the divergence time value 220. The fuel system monitor module 208 receives as input time data 230 from the timer module 209. The time data 230 is a time value of a timer set based on the receipt of the enable data 228. Stated another way, the time data 230 is an amount of time that has elapsed since the change in the concentration of Ethanol was determined to exceed the fuel concentration threshold 212. The fuel system monitor module 208 determines whether the time value of the time data 230 is equal to the divergence time value 220 such that the fuel with the change in Ethanol concentration has reached the divergence 164. Based on the time of the timer as equal to the divergence time value 220, the fuel system monitor module 208 sets divergence data 232 for the fuel injector control module 210. The divergence data 232 is data that indicates that the fuel from the fuel concentration sensor 40*a* has reached the divergence 164.

The timer module 209 receives as input the enable data 228 from the fuel system monitor module 208. Based on the enable data 228, the timer module 209 sets a timer equal to zero and starts the timer. The timer module 209 sets the time data 230, which comprises the time value of the timer, for the fuel system monitor module 208 and the fuel injector control module 210. It should be noted that the timer module

209 is merely exemplary as the timer module 209 may comprise a clock associated with the controller 34, for example.

The fuel injector control module 210 receives as input the divergence data 232. Based on the receipt of the divergence data 232, the fuel injector control module 210 queries the fuel system datastore 206 and retrieves the PFI volume data 222 and the SIDI volume data 224. The fuel injector control module 210 determines a proportion or ratio of the volume of the SIDI system 154 to the PFI system 152 based on the SIDI volume data 224 and the PFI volume data 222. The fuel injector control module 210 outputs proportional control data 234 to the fuel injection system 150 to control the port fuel injectors 170 and the direct fuel injectors 178. The proportional control data 234 is one or more control signals to command the port fuel injectors 170 and the direct fuel injectors 178 to operate based on the determined volume ratio between the SIDI system 154 and the PFI system 152 such that the fuel is drained evenly from the fuel injection system 150 through combustion by the internal combustion engine 112 during a normal combustion process. This ensures that the fuel within the SIDI system 154 and the PFI system 152 empties at the same time so that the fuel with the different Ethanol concentration reaches the tips 170*a* of the port fuel injectors 170 and the tips 178*a* of the direct fuel injectors 178 at the same time. In this example, the SIDI volume data 224 is 0.3 Liters (L) and the PFI volume data 222 is 0.1 Liters (L). The determined volume ratio is 3 (SIDI) to 1 (PFI), and the proportional control data 234 is one or more control signals to the fuel injection system 150 to operate the direct fuel injectors 178 at 75% and to operate the port fuel injectors 170 at 25%. Generally, one or more control signals to operate the direct fuel injectors 178 at 100% would command the fuel injection system 150 to operate the direct fuel injectors 178 and to not operate the port fuel injectors 170. Similarly, one or more control signals to operate the direct fuel injectors 178 at 0% would command the fuel injection system 150 to operate the port fuel injectors 170 and to not operate the direct fuel injectors 178.

The fuel injector control module 210 queries the fuel system datastore 206 and retrieves the cylinder time value 226. The fuel injector control module 210 receives as input the time data 230 from the timer module 209. The fuel injector control module 210 compares the cylinder time value 226 to the time data 230 and determines whether the time data 230 is equal to the cylinder time value 226. Based on the time data 230 as equal to the cylinder time value 226, the fuel injector control module 210 outputs normal control data 236. The normal control data 236 is one or more control signals to command the port fuel injectors 170 and the direct fuel injectors 178 to resume normal operation or to disable proportional control.

Figure 4:
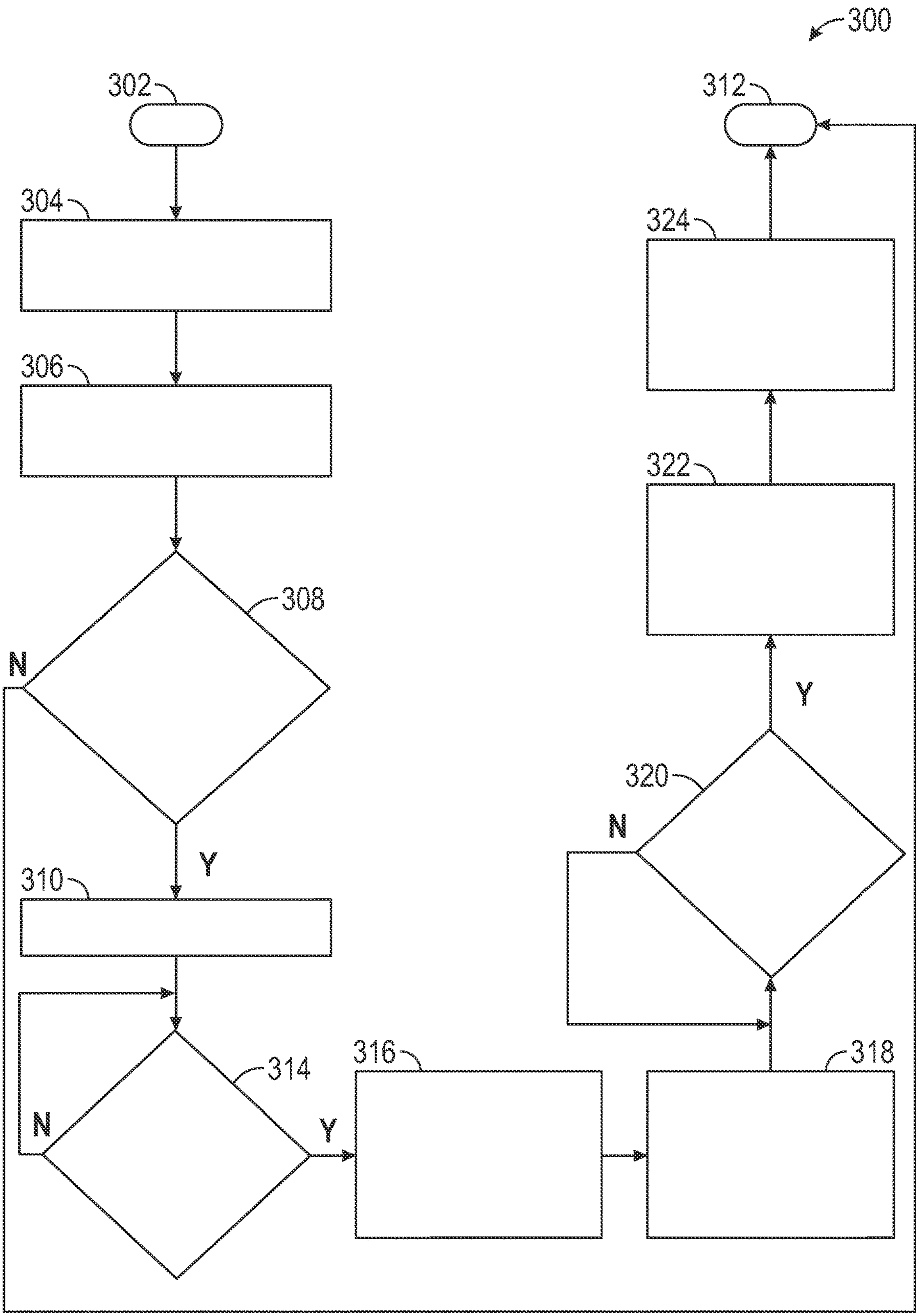
FIG. 4 is a flowchart illustrating a control method performed by the fuel injection control system of the vehicle in accordance with various embodiments.

Referring now to FIG. 4, and with continued reference to FIGS. 1-3, a flowchart illustrates a method 300 that can be performed by fuel injection control system 100 of FIG. 1 in accordance with the present disclosure. In one example, the method 300 is performed by the processor 44 of the controller 34. As can be appreciated in light of the disclosure, the order of operation within the method 300 is not limited to the sequential execution as illustrated in FIG. 4, but may be performed in one or more varying orders as applicable and in accordance with the present disclosure. In various embodiments, the method 300 can be scheduled to run based on one or more predetermined events, and/or can run continuously during operation of the vehicle 10.

The method begins at 302. At 304, the method 300 receives the percent concentration of Ethanol in the fuel from the fuel concentration sensor 40*a* and/or a module that models the value. At 306, the method 300 queries the fuel datastore 202 and retrieves the last known value 214 for the percent concentration of Ethanol. At 308, the method 300 compares the percent concentration of Ethanol observed by the fuel concentration sensor 40*a* to the last known value 214 to determine the change in the percent concentration of Ethanol. The method 300 queries the fuel datastore 202, and retrieves the fuel concentration threshold 212. The method 300 determines whether the change in the percent concentration of Ethanol is greater than the fuel concentration threshold 212. If true, the method 300 proceeds to 310. Otherwise, the method 300 ends at 312.

At 310, the method 300 sets a timer equal to zero. At 314, the method 300 determines the divergence time value 220. The method 300 compares the time value of the timer to the divergence time value 220, and determines whether the time value is equal to the divergence time value 220 such that the fuel having a different Ethanol percentage has reached the divergence 164. If the fuel has reached the divergence 164, the method 300 proceeds to 316. Otherwise, the method 300 loops until the time value of the timer is equal to the divergence time value 220.

At 316, the method 300 determines the ratio of the volume of the SIDI system 154 to the PFI system 152 based on the SIDI volume data 224 and the PFI volume data 222. At 318, the method 300 outputs the one or more control signals to command the port fuel injectors 170 and the direct fuel injectors 178 to operate based on the determined volume ratio between the SIDI system 154 and the PFI system 152 such that the fuel is drained evenly from the fuel injection system 150. At 320, the method 300 determines whether the fuel with the change in Ethanol concentration has reached the cylinders 116. In one example, the method 300 retrieves the cylinder time value 226 and compares the time value of the timer to the cylinder time value 226. If the time value of the timer is equal to the cylinder time value 226, the method 300 determines the fuel with the change in Ethanol concentration has reached the cylinders 116 and proceeds to 320. Otherwise, the method 300 loops.

At 322, the method 300 outputs one or more control signals to command the port fuel injectors 170 and the direct fuel injectors 178 to resume normal operation or to disable proportional control. At 324, the method 300 sets the percent concentration of Ethanol observed by the fuel concentration sensor 40*a* as the last known value 214 for the percent concentration of Ethanol in the fuel. The method 300 ends at 312.

Thus, the fuel injection control system 100 enables the vehicle 10 to operate more efficiently upon a change in Ethanol concentration in the fuel, which may occur during a refueling of the vehicle 10, for example. Generally, by controlling the port fuel injectors 170 and the direct fuel injectors 178 of the fuel injection system 150 proportionally or based on the determined volume ratio, the fuel present in the fuel injection system 150 (before the fuel with the change in Ethanol concentration was added) is drained from the fuel injection system 150 substantially evenly, such that the new fuel (with the change in Ethanol concentration) is received substantially simultaneously at the tips 170*a*, 178*a* of each of the port fuel injectors 170 and the direct fuel injectors 178, respectively. This enables the controller 34 to control the fuel injection system 150 based on the same fuel, which improves fuel economy and emissions, while ensuring drivability. The fuel injection control system 100 also reduces complexity of the instructions associated with the control of the fuel injection system 150.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a fuel system associated with a propulsion system of a vehicle, comprising:
- receiving, by a processor, a concentration of Ethanol in a fuel in the fuel system from a fuel concentration sensor, the fuel system including at least two fuel injection systems;
- querying, by the processor, a fuel datastore to retrieve a previously stored last known value of a concentration of the Ethanol in the fuel from the fuel datastore;
- comparing, by the processor, the last known value of the concentration of the Ethanol in the fuel to the concentration of the Ethanol in the fuel received from the fuel concentration sensor;
- determining, by the processor, whether a percentage change in the concentration of the Ethanol in the fuel exceeds a fuel concentration threshold based on the comparison, wherein the fuel concentration threshold is a predefined value for a percentage change value of 20%; and
- based on a determination, by the processor, that the change in the concentration of the Ethanol in the fuel exceeds the fuel concentration threshold:
  - determining, by the processor, the fuel with the change in the concentration of the Ethanol has reached a divergence defined between the at least two fuel injection systems;
  - determining, by the processor, a volume ratio between the at least two fuel injection systems; and
  - outputting a first control signal, by the processor, to command the at least two fuel injection systems to enable proportional control based on the volume ratio.

2. The method of claim 1, wherein the determining the fuel has reached the divergence is based on a pump flow rate of a fuel pump, a position of the fuel concentration sensor and a volume of a main fuel line associated with the vehicle.

3. The method of claim 1, wherein the at least two fuel injection systems include a port fuel injection system and a spark ignition direct injection system, and the determining the volume ratio between the port fuel injection system and the spark ignition direct injection system is based on a volume of the port fuel injection system from the divergence to a tip of at least one port fuel injector and a volume of the spark ignition direct injection system from the divergence to a tip of at least one direct fuel injector.

4. The method of claim 3, wherein the spark ignition direct injection system includes a high pressure fuel pump, and the volume of the spark ignition direct injection system includes a volume of the high pressure fuel pump.

5. The method of claim 1, further comprising:
- determining, by the processor, the fuel with the change in the concentration of the Ethanol has reached at least one cylinder associated with the propulsion system.

6. The method of claim 5, wherein the at least two fuel injection systems include a port fuel injection system and a spark ignition direct injection system and the method further comprises:
- based on the determining the fuel with the change in the concentration of the Ethanol has reached the at least one cylinder, outputting a second control signal by the processor, to command the port fuel injection system and the spark ignition direct injection system to disable the proportional control based on the volume ratio.

7. The method of claim 5, wherein the at least two fuel injection systems include a port fuel injection system and a spark ignition direct injection system and the determining the fuel with the change in the concentration of the Ethanol has reached the at least one cylinder is based on a pump flow rate of a fuel pump associated with the vehicle, a volume of the port fuel injection system from the divergence to a tip of at least one port fuel injector and a volume of the spark ignition direct injection system from the divergence to a tip of at least one direct fuel injector.

8. The method of claim 1, further comprising:
- based on the determination, by the processor, that the change in the concentration of the Ethanol in the fuel exceeds the fuel concentration threshold:
  - setting by the processor, a first time value of a timer to zero, wherein successive time values of the timer represent amount of time elapsed since the change in the concentration of the Ethanol in the fuel was determined to exceed the fuel concentration threshold;
  - querying by the processor, a fuel system datastore to retrieve a divergence time value;
  - determining, by the processor, whether a second time value of the timer is equal to the divergence time value indicating that the fuel with the change in the concentration of the Ethanol has reached the divergence defined between the at least two fuel injection systems; and
  - determining, by the processor, the volume ratio between the at least two fuel injection systems based on the determination.

9. The method of claim 8, further comprising:
- querying by the processor, the fuel system datastore to retrieve a cylinder time value;
- determining, by the processor, whether a third time value of the timer is equal to the cylinder time value indicating that the fuel with the change in the concentration of the Ethanol has reached cylinders of the fuel system; and
- output a second control signal, by the processor, to command the at least two fuel injection systems to disable the proportional control and resume normal operation.

10. A vehicle, comprising:
- a propulsion system including a fuel system having a fuel tank configured to receive a fuel, a fuel pump fluidly coupled to the fuel tank and configured to direct the fuel to a main fuel line, the main fuel line fluidly coupled to at least two fuel injection systems at a divergence;
- a fuel concentration sensor coupled to the main fuel line and configured to observe a concentration of Ethanol in the fuel in the fuel system;
- a controller having a processor configured to:

receive the concentration of the Ethanol in the fuel in the fuel system from the fuel concentration sensor;
query a fuel datastore to retrieve a previously stored last known value of a concentration of the Ethanol in the fuel from the fuel datastore;
compare the last known value of the concentration of the Ethanol in the fuel to the concentration of the Ethanol in the fuel received from the fuel concentration sensor;
determine, whether a percentage change in the concentration of the Ethanol in the fuel exceeds a fuel concentration threshold based on the comparison, wherein the fuel concentration threshold is a predefined value for a percentage change value of 20%; and
based on a determination that the change in the concentration of the Ethanol in the fuel exceeds the fuel concentration threshold:
determine, the fuel with the change in the concentration of the Ethanol has reached the divergence defined between the at least two fuel injection systems;
determine a volume ratio between the at least two fuel injection systems; and
output a first control signal to command the at least two fuel injection systems to enable proportional control based on the volume ratio.

11. The vehicle of claim 10, wherein the controller is configured to determine the fuel has reached the divergence based on a pump flow rate of the fuel pump, a position of the fuel concentration sensor and a volume of the main fuel line associated with the vehicle.

12. The vehicle of claim 10, wherein the at least two fuel injection systems include a port fuel injection system and a spark ignition direct injection system, and the controller is configured to determine the volume ratio between the port fuel injection system and the spark ignition direct injection system based on a volume of the port fuel injection system from the divergence to a tip of at least one port fuel injector and a volume of the spark ignition direct injection system from the divergence to a tip of at least one direct fuel injector.

13. The vehicle of claim 12, wherein the spark ignition direct injection system includes a high pressure fuel pump, and the volume of the spark ignition direct injection system includes a volume of the high pressure fuel pump.

14. The vehicle of claim 10, wherein the controller is further configured to determine the fuel with the change in the concentration of the Ethanol has reached at least one cylinder associated with the propulsion system.

15. The vehicle of claim 14, wherein the at least two fuel injection systems include a port fuel injection system and a spark ignition direct injection system, and based on the determination that the fuel with the change in the concentration of the Ethanol has reached the at least one cylinder, the controller is further configured to output a second control signal to command the port fuel injection system and the spark ignition direct injection system to disable the proportion control based on the volume ratio.

16. The vehicle of claim 14, wherein the at least two fuel injection systems include a port fuel injection system and a spark ignition direct injection system, and the controller is configured to determine that the fuel with the change in the concentration of the Ethanol has reached the at least one cylinder based on a pump flow rate of the fuel pump, a volume of the port fuel injection system from the divergence to a tip of at least one port fuel injector and a volume of the spark ignition direct injection system from the divergence to a tip of at least one direct fuel injector.

17. A method for controlling a fuel system associated with a propulsion system of a vehicle, comprising:
receiving, by a processor, a concentration of Ethanol in a fuel in the fuel system from a fuel concentration sensor, the fuel system including a port fuel injection system and a spark ignition direct injection system;
querying, by the processor, a fuel datastore to retrieve a previously stored last known value of a concentration of the Ethanol in the fuel from the fuel datastore;
comparing, by the processor, the last known value of the concentration of the Ethanol in the fuel to the concentration of the Ethanol in the fuel received from the fuel concentration sensor;
determining, by the processor, whether a percentage change in the concentration of the Ethanol in the fuel exceeds a fuel concentration threshold based on the comparison, wherein the fuel concentration threshold is a predefined value for a percentage change value of 20%; and
based on a determination, by the processor, that the change in the concentration of the Ethanol in the fuel exceeds the fuel concentration threshold:
determining, by the processor, the fuel with the change in the concentration of the Ethanol has reached a divergence defined between the port fuel injection system and the spark ignition direct injection system;
determining, by the processor, a volume ratio between the port fuel injection system and the spark ignition direct injection system;
outputting a first control signal, by the processor, to command the port fuel injection system and the spark ignition direct injection system to enable proportion control based on the volume ratio;
determining, by the processor, the fuel with the change in the concentration of the Ethanol has reached at least one cylinder associated with the propulsion system; and
based on the determining the fuel with the change in the concentration of the Ethanol has reached the at least one cylinder, outputting a second control signal, by the processor, to command the port fuel injection system and the spark ignition direct injection system to disable the proportion control based on the volume ratio.

18. The method of claim 17, wherein the determining the fuel has reached the divergence is based on a pump flow rate of a fuel pump and a volume of a main fuel line associated with the vehicle.

19. The method of claim 17, wherein the determining the volume ratio between the port fuel injection system and the spark ignition direct injection system is based on a volume of the port fuel injection system from the divergence to a tip of at least one port fuel injector and a volume of the spark ignition direct injection system from the divergence to a tip of at least one direct fuel injector.

20. The method of claim 19, wherein the determining the fuel with the change in the concentration of the Ethanol has reached the at least one cylinder is based on a pump flow rate of a fuel pump associated with the vehicle, the volume of the port fuel injection system from the divergence to the tip of the at least one port fuel injector and the volume of the spark ignition direct injection system from the divergence to the tip of the at least one direct fuel injector.

* * * * *